UNITED STATES PATENT OFFICE.

ANN ELIZA BANKS, OF BLAND COURT-HOUSE, VIRGINIA.

LINIMENT.

SPECIFICATION forming part of Letters Patent No. 377,979, dated February 14, 1888.

Application filed June 3, 1887. Serial No. 240,192. (No specimens.)

*To all whom it may concern:*

Be it known that I, ANN ELIZA BANKS, a citizen of the United States, residing at Bland Court-House, in the county of Bland and State of Virginia, have invented a new and useful composition of matter or liniment to be used for the treatment of burns, as also of cuts, bruises, and other external sores of man or beast, of which the following is a specification.

My composition consists of the following ingredients, combined in the proportions stated, viz: Castor-oil, eight ounces; linseed-oil, four ounces; lard, four ounces; spirits of turpentine, one ounce; sulphur, one-half ounce; opium, four grains; lime, (air-slaked,) one and a half ounce; kerosene-oil, two ounces. These ingredients should be warmed sufficiently to melt them and then thoroughly mingled by agitation, and should be mixed in an earthenware vessel with a wooden spoon and let stand four or five days until thoroughly dissolved, and then strained through a thin cloth and put in glass bottles.

In using the above-named composition it should be applied to the burn or sore as any other liniment is. Two or three applications are usually sufficient.

By the use of this composition all inflammation and fever of burns or any external sores may be mitigated.

I am aware that all of the ingredients of the above composition are well known as medicines; but I am not aware that all of the ingredients of my composition have been compounded in one medicine.

What I claim, and desire to secure by Letters Patent of the United States, is—

The herein-described liniment to be used for the relief of burns and external sores, consisting of castor-oil, linseed-oil, lard, spirits of turpentine, sulphur, opium, lime, and kerosene-oil, in the proportions specified.

ANN ELIZA BANKS.

Witnesses:
WILLIAM WAYNE GRAYSON,
SIDNEY JOHNSON BANKS.